United States Patent
Zhu et al.

(10) Patent No.: US 10,819,020 B2
(45) Date of Patent: Oct. 27, 2020

(54) ANTENNA SYSTEM AND A MOBILE TERMINAL

(71) Applicant: AAC Technologies Pte. Ltd., Singapore (SG)

(72) Inventors: Jianpeng Zhu, Shenzhen (CN); Li Han, Shenzhen (CN); Hua Jiang, Shenzhen (CN); Xufeng Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/703,891

(22) Filed: Dec. 5, 2019

(65) Prior Publication Data
US 2020/0212543 A1     Jul. 2, 2020

(30) Foreign Application Priority Data
Dec. 28, 2018 (CN) .................... 2018 2 2274774 U

(51) Int. Cl.
| | |
|---|---|
| H04M 1/00 | (2006.01) |
| H01Q 1/24 | (2006.01) |
| H01Q 5/307 | (2015.01) |
| H01Q 1/48 | (2006.01) |
| H04M 1/02 | (2006.01) |

(52) U.S. Cl.
CPC ............. *H01Q 1/243* (2013.01); *H01Q 1/48* (2013.01); *H01Q 5/307* (2015.01); *H04M 1/026* (2013.01)

(58) Field of Classification Search
CPC .......... H01Q 1/243; H01Q 5/307; H01Q 1/48; H04M 1/026

USPC ...................................................... 455/575.7
See application file for complete search history.

(56) References Cited

U.S. PATENT DOCUMENTS

| | | | | |
|---|---|---|---|---|
| 8,446,989 | B2 * | 5/2013 | Oizumi | H04L 25/0204 |
| | | | | 375/259 |
| 8,866,692 | B2 * | 10/2014 | Vazquez | H01Q 1/2291 |
| | | | | 343/702 |
| 9,385,795 | B1 * | 7/2016 | Ananthanarayanan ... | H04L 5/08 |
| 9,472,861 | B2 * | 10/2016 | Bi | H01Q 21/28 |
| 10,331,179 | B1 * | 6/2019 | Xia | H01Q 21/0006 |
| 10,581,153 | B2 * | 3/2020 | Edwards | H01Q 9/42 |
| 2007/0066245 | A1 * | 3/2007 | Snider | H04B 1/48 |
| | | | | 455/78 |
| 2011/0268037 | A1 * | 11/2011 | Fujimoto | H04B 7/0851 |
| | | | | 370/328 |
| 2016/0066307 | A1 * | 3/2016 | Huang | H04B 1/0064 |
| | | | | 370/329 |

(Continued)

*Primary Examiner* — Sonny Trinh
(74) *Attorney, Agent, or Firm* — W&G Law Group LLP

(57) ABSTRACT

The embodiments of the present invention relate to the field of communication technology, and disclose an antenna system and a mobile terminal. In the present disclosure, the antenna system includes: a first antenna, a second antenna, a third antenna, a fourth antenna, and a fifth antenna, wherein the first antenna, the second antenna, the fourth antenna, and the fifth antenna constitute a 4*4 MIMO operating at 3300 MHz to 3600 MHz, the second antenna and the third antenna constitute a 2*2 MIMO operating at 4800 MHz~5000 MHz, so that the antenna system of the present disclosure can support the operating band of the terminal in 5G communication, promoting the development of mobile terminal in the aspect of 5G communication.

18 Claims, 17 Drawing Sheets

(56) References Cited

U.S. PATENT DOCUMENTS

2019/0179378 A1\* 6/2019 Xia .................... H01Q 1/243
2019/0260126 A1\* 8/2019 Ayala Vazquez ...... H01Q 9/065

\* cited by examiner

ANTENNA SYSTEM AND A MOBILE TERMINAL

TECHNICAL FIELD

The embodiments of the present disclosure relates to the field of communication technology, and in particular, to an antenna system and a mobile terminal.

BACKGROUND

With the development of communication technology, antennas play an increasingly important role in data communication. In 3G and 4G communication technologies of the prior art, different antenna structures are respectively adopted for mobile terminals such as mobile phones to meet different data communication requirements.

The inventor has found at least the following problem in the prior art: at present, 5G communication becomes an inevitable trend with communication technology development, while the antenna structure adopted by existing terminals cannot support the operating band for 5G communication, thereby limiting the development for mobile terminals in terms of 5G communication.

BRIEF DESCRIPTION OF THE DRAWINGS

One or more embodiments are exemplified by corresponding pictures in the accompanying drawings, and these exemplary descriptions do not constitute a limitation on the embodiments. Elements in the drawings having the same reference numerals represent like elements, and unless otherwise stated, the figures in the drawings do not constitute a scale limitation.

DETAILED DESCRIPTION

To make the purpose, technical solution and advantage of embodiments of the present disclosure more clear, embodiments of the present disclosure will be described in detail below with reference to the accompanying drawings. However, it will be understood by those skilled in the art that, in the various embodiments of the present disclosure, numerous technical details are set forth in order to aid understanding the present application in a better way. However, the technical solutions claimed in the present application may also be implemented without these technical details and various changes and modifications made based on the following embodiments.

Figure 1:
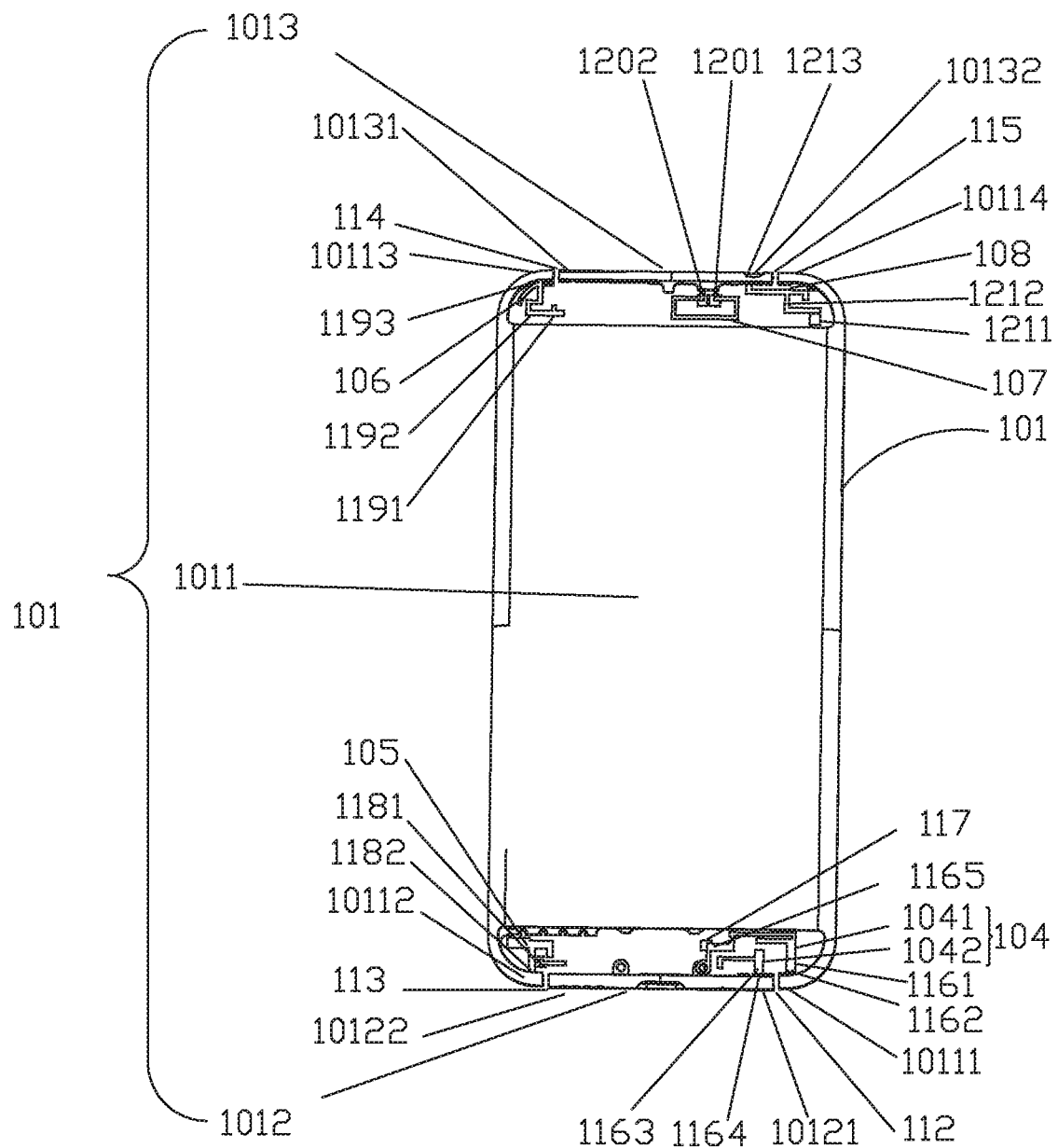
FIGS. 1 to 3 are schematic structural diagrams of an antenna system according to the first embodiment of the present application.
Figure 2:
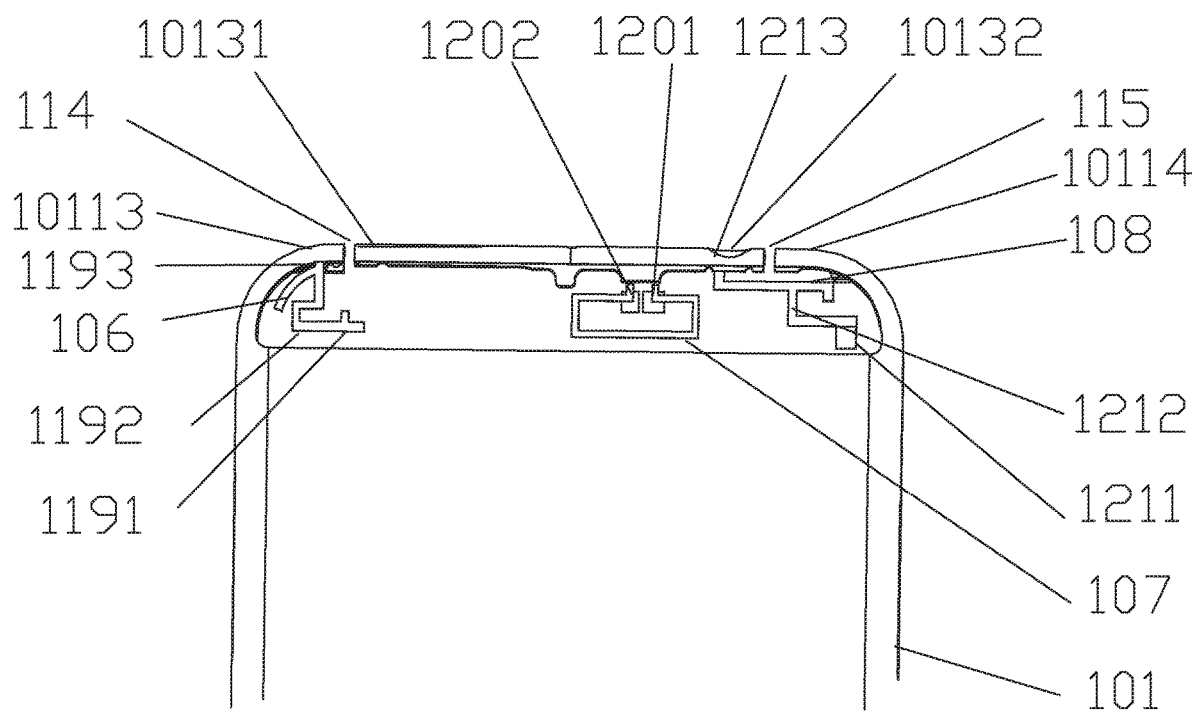
Figure 3:
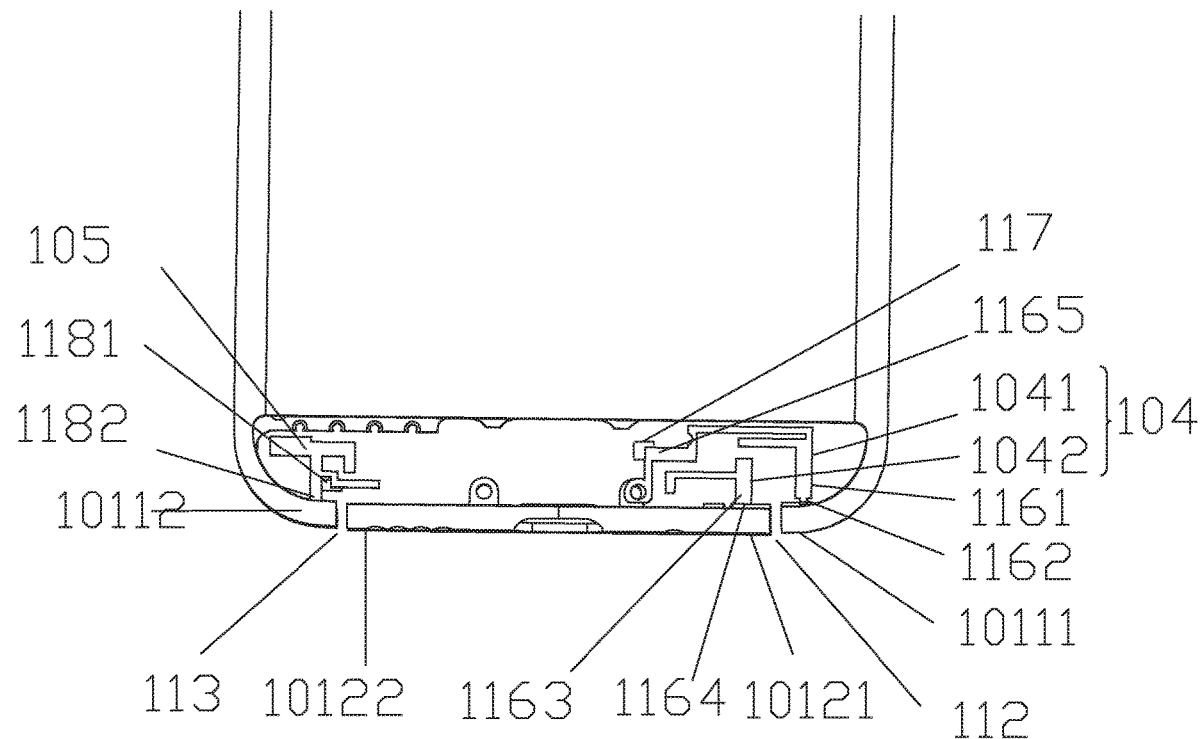
Figure 4:
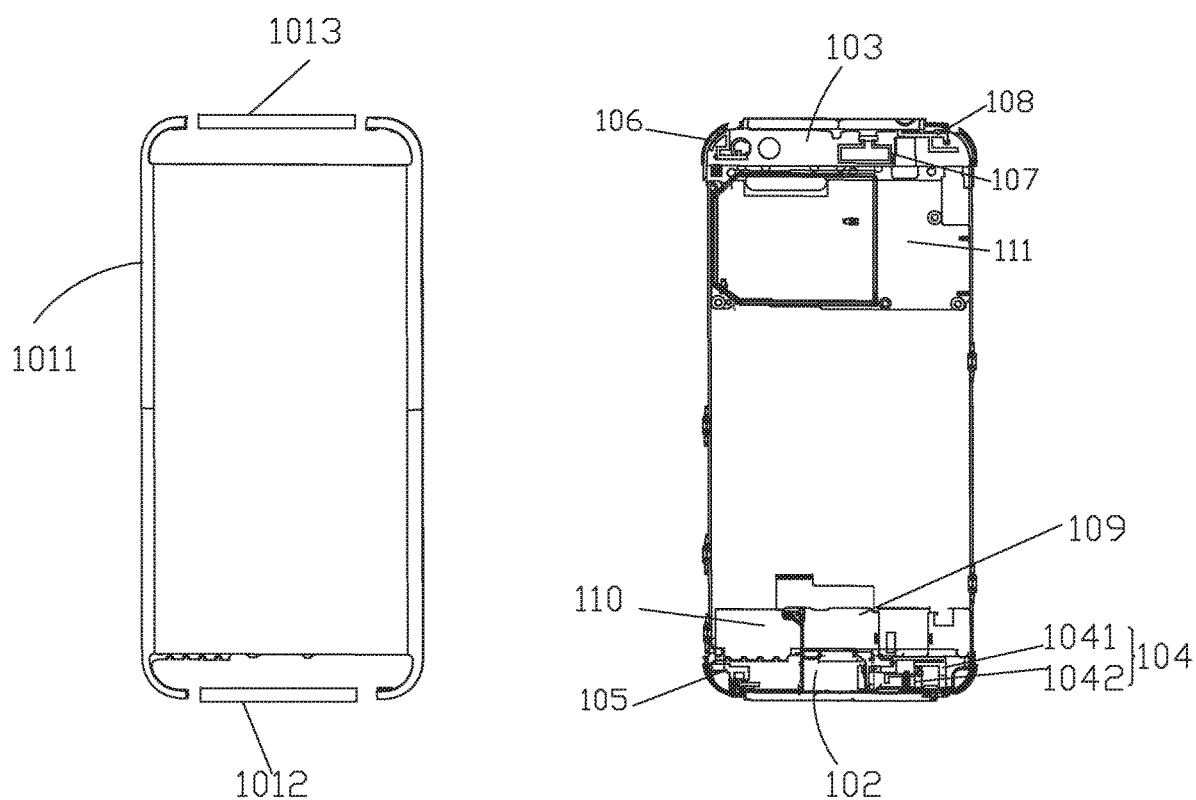
FIGS. 4 to 6 are schematic structural diagrams illustrating a portion of the antenna system according to the first embodiment of the present application.
Figure 5:
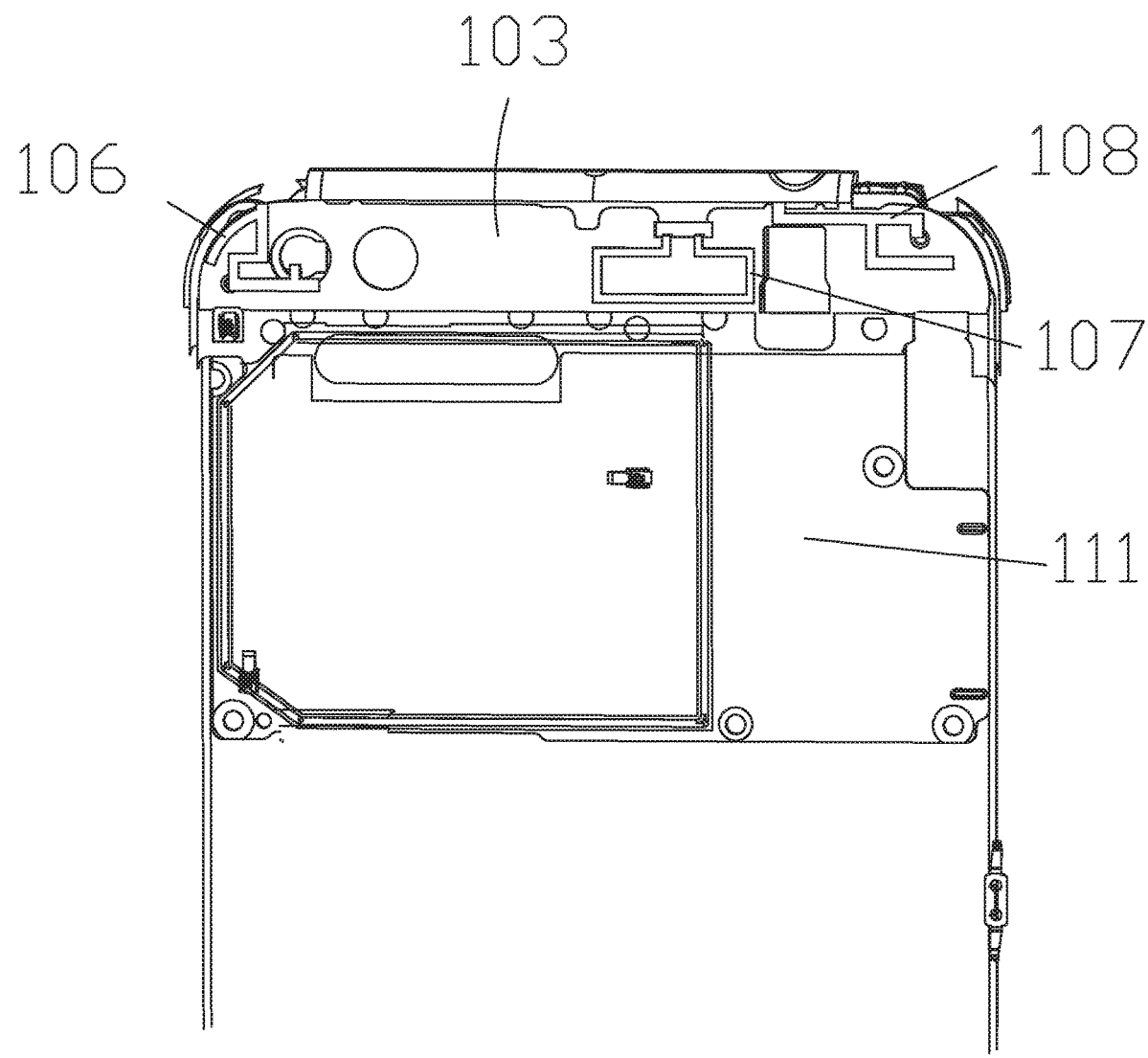
Figure 6:
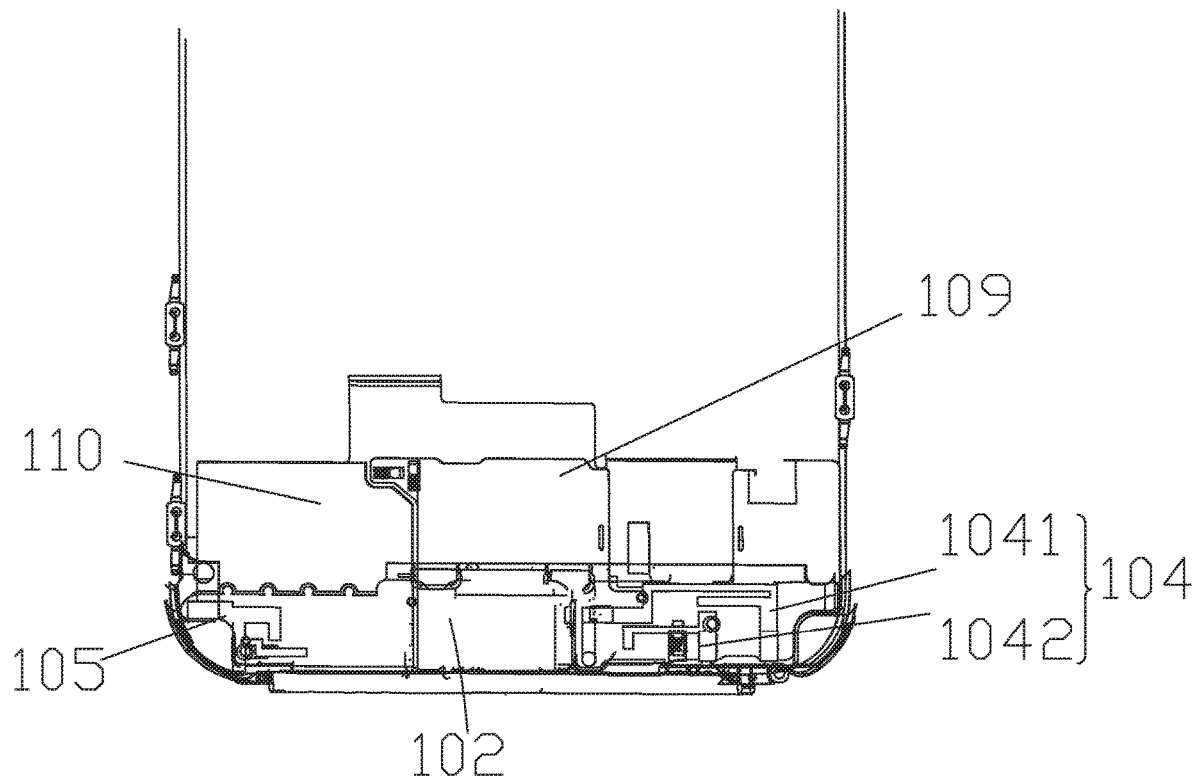

The first embodiment of the present disclosure relates to an antenna system. FIG. 1 to FIG. 3 are structural schematic diagrams illustrating the antenna system, and FIG. 1 depicts the position distribution of antennas, FIG. 2 is a structural schematic diagram illustrating an upper portion of the antenna system, and FIG. 3 is a structural schematic diagram illustrating a lower portion of the antenna system. In order to analyze an internal structure of the antenna in detail, FIG. 4 to FIG. 6 which are exploded views of the antenna system are referred to. FIG. 4 is an exploded view of the whole antenna, FIG. 5 is an exploded view of the upper portion of the antenna system, and FIG. 6 is an exploded view of the lower portion of the antenna system. According to the present embodiment, the antenna system includes: a metal casing 101; and a first antenna bracket 102 and a second antenna bracket 103 disposed in the metal casing 101. The metal casing 101 includes a metal mid-frame 1011, a first metal edge-frame 1012 and a second metal edge-frame 1013 disconnected from the metal mid-frame 1011 respectively. A first antenna 104 is provided at a first position of the first antenna bracket 101, and the first antenna 104 is electrically connected to the metal mid-frame 1011 and the first metal edge-frame 1012 respectively. A second antenna 105 is provided at a second position of the first antenna bracket 102, and the second antenna 105 is electrically connected to the metal mid-frame 1011. A third antenna 106 is provided at a first position of the second antenna bracket, and the third antenna 106 is electrically connected to the metal mid-frame 1011. A fourth antenna 107 is provided at a second position of the second antenna bracket, a fifth antenna 108 is provided at a third position of the second antenna bracket, and the fifth antenna 108 is electrically connected to the second metal edge-frame 1013. The first antenna 104, the second antenna 105, the fourth antenna 107, and the fifth antenna 108 constitute a 4*4 MIMO operating at 3300 MHz to 3600 MHz, and the second antenna 105 and the third antenna 106 constitute a 2*2 MIMO operating at 4800 MHz to 5000 MHz.

The antenna of the present embodiment further includes a first circuit board 109 and a second circuit board 110 disposed in the metal casing and below the first antenna bracket, and a third circuit board 111 disposed in the metal casing and below the second antenna bracket.

It should be noted that, in this embodiment, the first metal edge-frame includes a first end 10121 of the first metal edge-frame and a second end 10122 of the first metal edge-frame, and the second metal edge-frame includes a first end 10131 of the second metal edge-frame and a second end 10132 of the second metal edge-frame, the metal mid-frame 1011 includes a first end 10111 of the metal mid-frame, a second end 10112 of the metal mid-frame, a third end 10113 of the metal mid-frame, and a fourth end 10114 of the metal mid-frame. A first slit 112 is provided between the first end of the first metal edge-frame and the first end of the metal mid-frame, and a second slit 113 is provided between the second end of the first metal edge-frame and the second end of the metal mid-frame, a third slit 114 is provided between the first end of the second metal edge-frame and the third end of the metal mid-frame, and a fourth slit 115 is provided between the second end of the second metal edge-frame and the fourth end of the metal mid-frame, wherein the first slit 112, the second slit 113, the third slit 114, and the fourth slit 115 are filled with insulating materials respectively.

In the present embodiment, the first antenna 104 includes a first branch 1041 and a second branch 1042. A first position 1161 of the first branch is electrically connected to a grounding point on the first circuit board 109, and a second position 1162 of the first branch is electrically connected to the first end 10111 of the metal mid-frame, a first position 1163 of the second branch is electrically connected to a feeding point of the first circuit board 109, and a second position 1164 of the second branch is electrically connected with the first end 10121 of the first metal edge-frame. In the present embodiment, the first position 1161 of the first branch is electrically connected to the grounding point in the first circuit board 109 via a metal dome, and the first position 1163 of the second branch is connected to the feeding point in the first circuit board 109 via a dome. Of course, in the present embodiment, the dome is taken as an example for illustration, and other conductive material may be adopted, which falls within the protection scope of the application.

The antenna system further includes an access switch 117. The access switch is disposed on the first circuit board 109 and electrically connected to a third position 1165 of the first branch, wherein the access switch 117 is configured for switching an operating band of the first antenna 104. In the embodiment, by adding the access switch 117, the operating band of the first antenna 104 may be switched, and thus the first antenna 104 is capable of switching among multiple operating modes.

A first position 1181 of the second antenna is electrically connected to a grounding point on the second circuit board 110, and a second position 1182 of the second antenna is electrically connected to the second end 10112 of the metal mid-frame. The second antenna 105 is electrically connected to the second circuit board 110 and the metal mid-frame 1011, thus the second antenna is capable of operating in the 5G communication band.

It should be noted that, in this embodiment, a first position 1191 of the third antenna is electrically connected to a first grounding point on the third circuit board 111, and a second position 1192 of the third antenna is electrically connected to a first feeding point on the third circuit board 111, and a third position 1193 of the third antenna is electrically connected to a third end 10113 of the metal mid-frame. The third antenna 106 is electrically connected to the third circuit board 111 and the metal mid-frame 1011, thus the third antenna 106 is capable of operating in the 5G communication frequency band.

A first position 1201 of the fourth antenna is electrically connected to a second grounding point on the third circuit board 111, and a second position 1202 of the fourth antenna is electrically connected to a second feeding point on the third circuit board 111. The fourth antenna 107 is electrically connected to the third circuit board 111, thus the fourth antenna 107 is capable of operating in the 5G communication frequency band.

A first position 1211 of the fifth antenna is electrically connected to a third grounding point on the third circuit board 111, a second position 1212 of the fifth antenna is electrically connected to a third feeding point on the third circuit board 111, and a third position 1213 of the fifth antennas is electrically connected to the second end 10132 of the second metal edge-frame. In this implementation, the fifth antenna 108 is electrically connected to the third circuit board 111 and the second metal edge-frame 1011, thereby the fifth antenna 108 is capable of operating in the 5G communication frequency band.

The operating band of the first antenna 104 further includes 824 MHz~960 MHz and 1710 MHz~2690 MHz, and the operating band of the third antenna 106 further includes 2400 MHz~2500 MHz and 2300 MHz~2700 MHz, and the operating band of the fifth antenna 108 further includes 1550 MHz~1600 MHz and 1800 MHz~2700 MHz. In the present embodiment, the first antenna 104, the third antenna 106, and the fifth antenna 108 may also operate in the existing 3G and 4G communication bands, thus increasing functions performed by each antenna.

It should be noted that, in this embodiment, the first slit 112, the second slit 113, the third slit 114, and the fourth slit 115 may be 1.2 mm, the lengths of the first metal edge-frame 1012 and the second metal edge-frame 1013 may be 42.7 mm, the width of the metal mid-frame 1011 may be 8.9 mm, and the distance between the second metal edge-frame 1013 and the metal mid-frame 1011 may be 8.9 mm. Of course, the above values are just taken as an example in the embodiments, and other values may be adopted as needed according to practical requirements, and the value of each size shall not be specifically limited to in the embodiments.

Compared with the prior art, the antenna system in this embodiment includes a first antenna, a second antenna, a third antenna, a fourth antenna, and a fifth antenna respectively; the first antenna, the second antenna, the fourth antenna and the fifth antenna constitute a multi-input multi-output antenna with an operating frequency of 3300 MHz to 3600 MHz, and the second antenna and the third antenna constitute a multi-input multi-output antenna with an operating band of 4800 MHz to 5000 MHz. Thus, the antenna system is capable of supporting an operating band for the terminal in 5G communication, which facilitates the development of mobile terminals in the aspect of 5G communication.

A second embodiment of the present disclosure relates to an antenna system. The second embodiment is substantially the same as the first embodiment. In this embodiment, the transmission effect of each antenna in the antenna system is mainly described.

Figure 7:
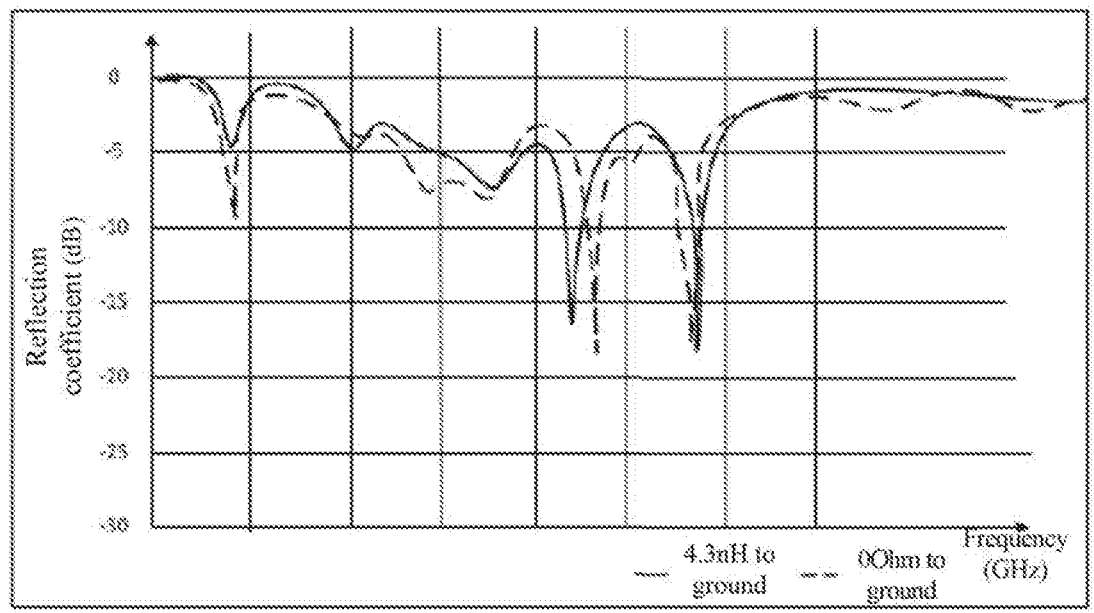
FIG. 7 is a graph illustrating a reflection coefficient of a first antenna according to the second embodiment of the present application.
Figure 8:
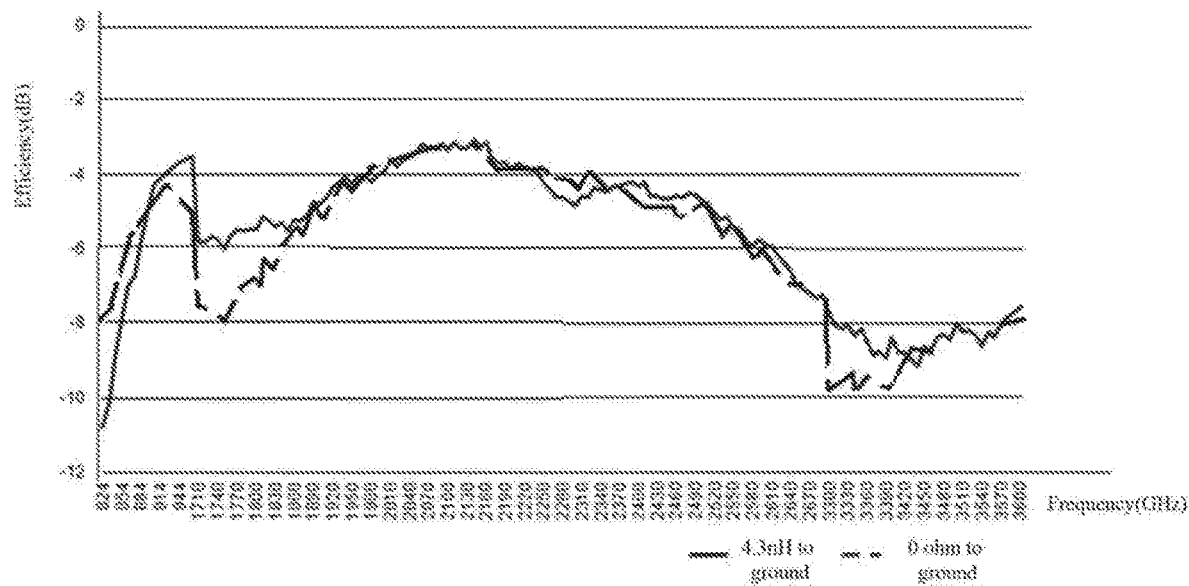
FIG. 8 is a graph illustrating an efficiency of the first antenna according to the second embodiment of the present application.

FIG. 7 is a graph illustrating a reflection coefficient of the first antenna, and FIG. 8 is a graph illustrating an efficiency of the first antenna. In the present embodiment, the first antenna is the main antenna in the antenna system, and it has two operating modes, including 4.3 nH to ground and 0 Ohm to ground. It can be seen from the figures that the first antenna has a good performance at 3300 MHz~3600 MHz, 824 MHz~960 MHz and 1710 MHz~2690 MHz.

Figure 9:
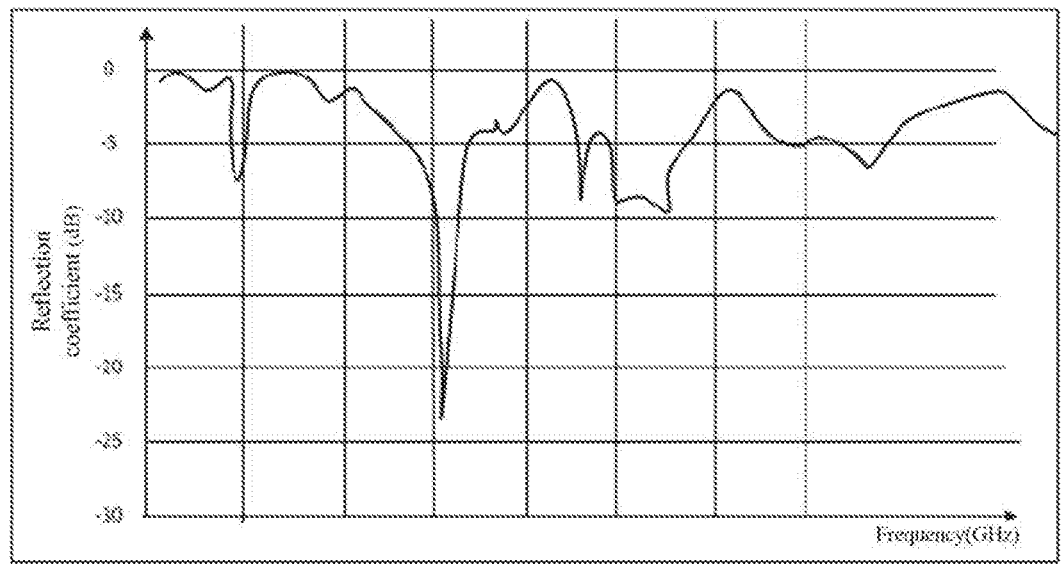
FIG. 9 is a graph illustrating a reflection coefficient of the second antenna according to the second embodiment of the present application.
Figure 10:
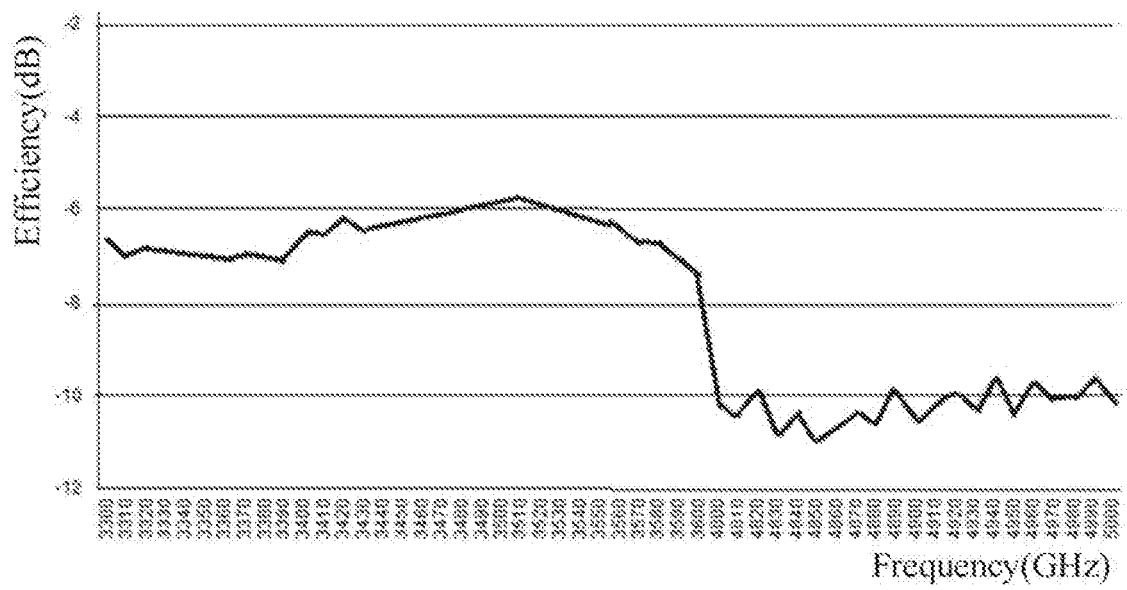
FIG. 10 is a graph illustrating an efficiency of the second antenna according to the second embodiment of the present application.

FIG. 9 is a graph illustrating a reflection coefficient of the second antenna, and FIG. 10 is a graph illustrating an efficiency of the second antenna. It can be seen from the figures that the second antenna has a good performance at 3300 MHz~3600 MHz and 4800 MHz~5000 MHz.

Figure 11:
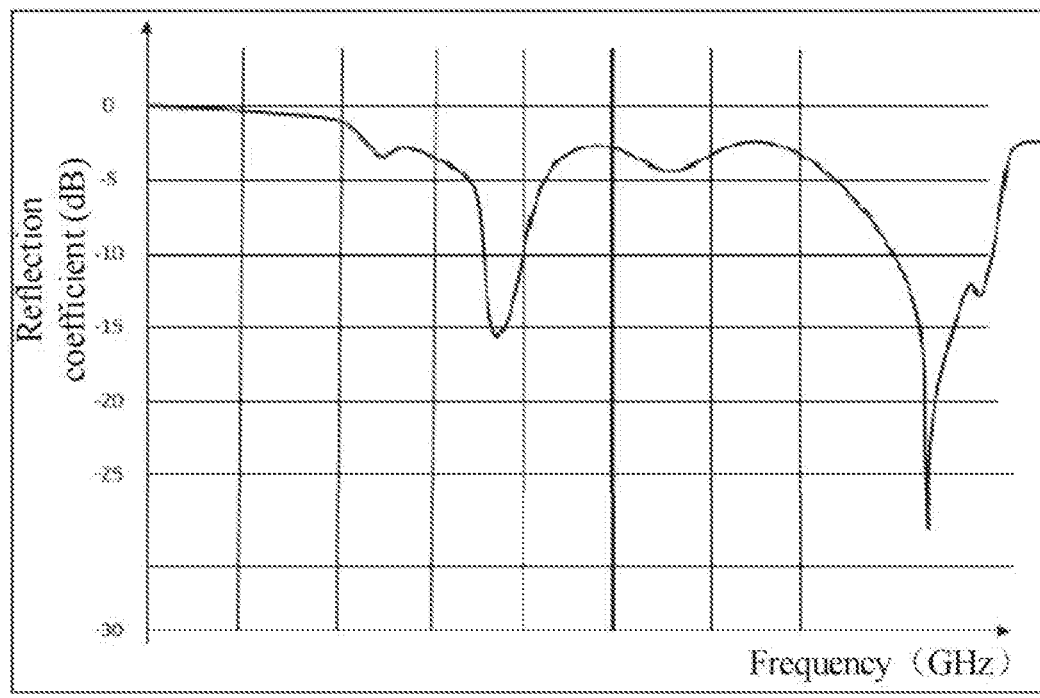
FIG. 11 is a graph illustrating a reflection coefficient of a third antenna according to the second embodiment of the present application.
Figure 12:
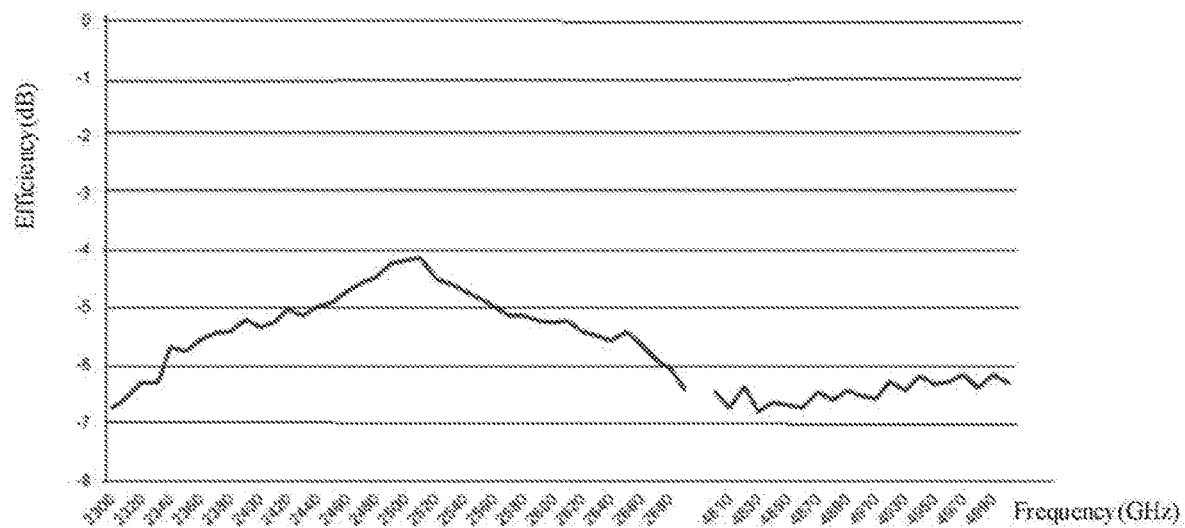
FIG. 12 is a graph illustrating an efficiency of the third antenna according to the second embodiment of the present application.

FIG. 11 is a graph illustrating a reflection coefficient of the third antenna, and FIG. 12 is a graph illustrating an efficiency of the third antenna. It can be seen from the figures that the third antenna has a good performance at 4800 MHz~5000 MHz, 2400 MHz~2500 MHz, and 2300 MHz~2700 MHz.

Figure 13:
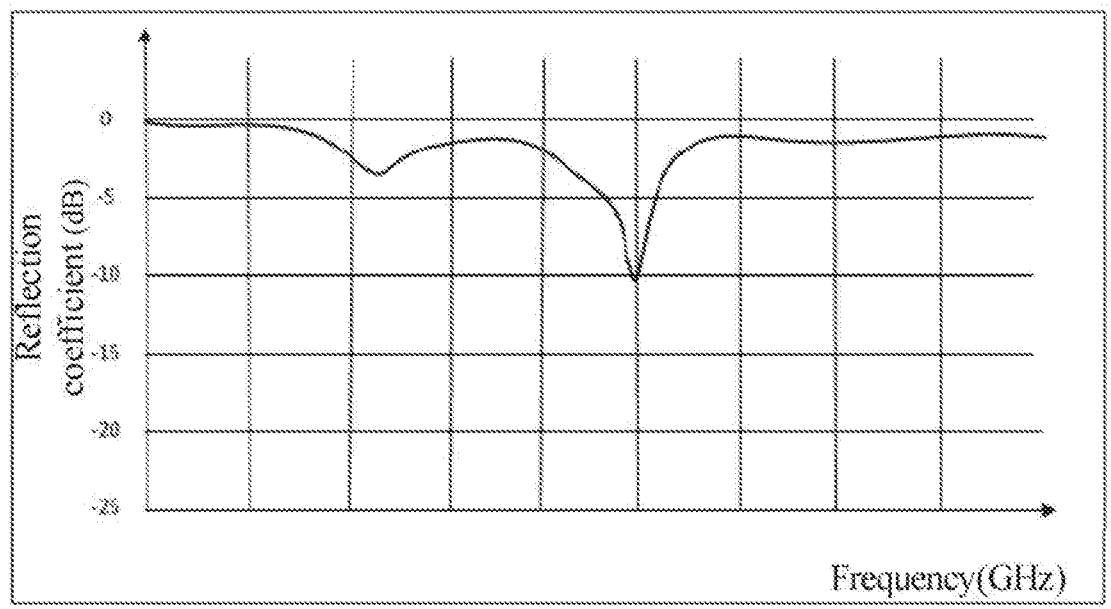
FIG. 13 is a graph illustrating a reflection coefficient of a fourth antenna according to the second embodiment of the present application.
Figure 14:
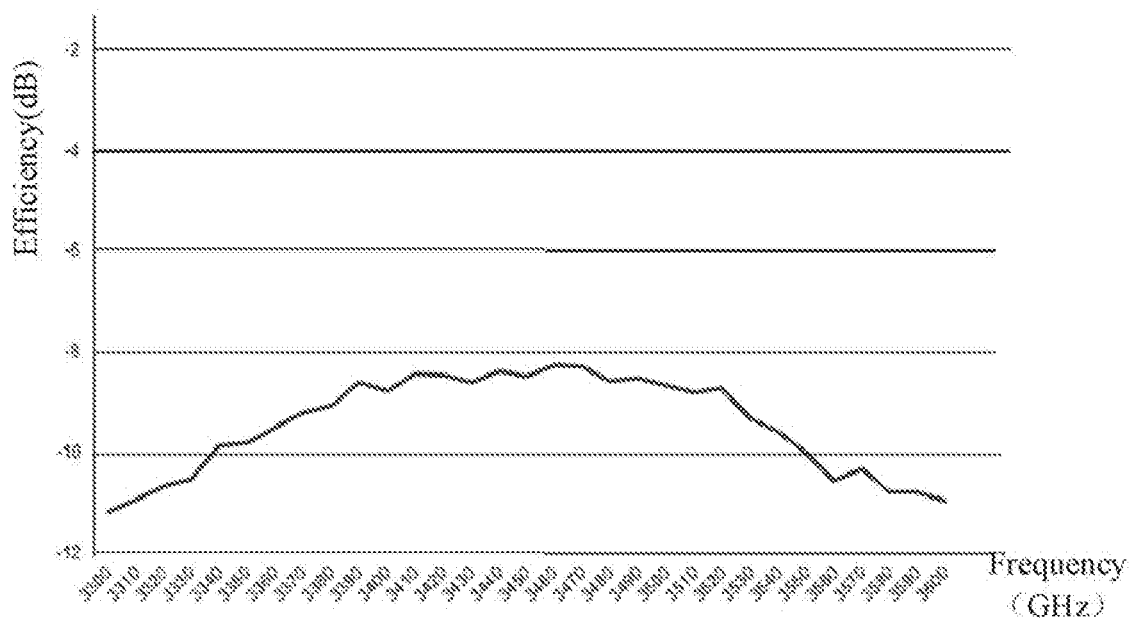
FIG. 14 is a graph illustrating an efficiency of the fourth antenna according to the second embodiment of the present application.

FIG. 13 is a graph illustrating a reflection coefficient of the fourth antenna, and FIG. 14 is a graph illustrating an efficiency of the fourth antenna. It can be seen from the figure that the fourth antenna has a good performance at 3300 MHz~3600 MHz.

Figure 15:
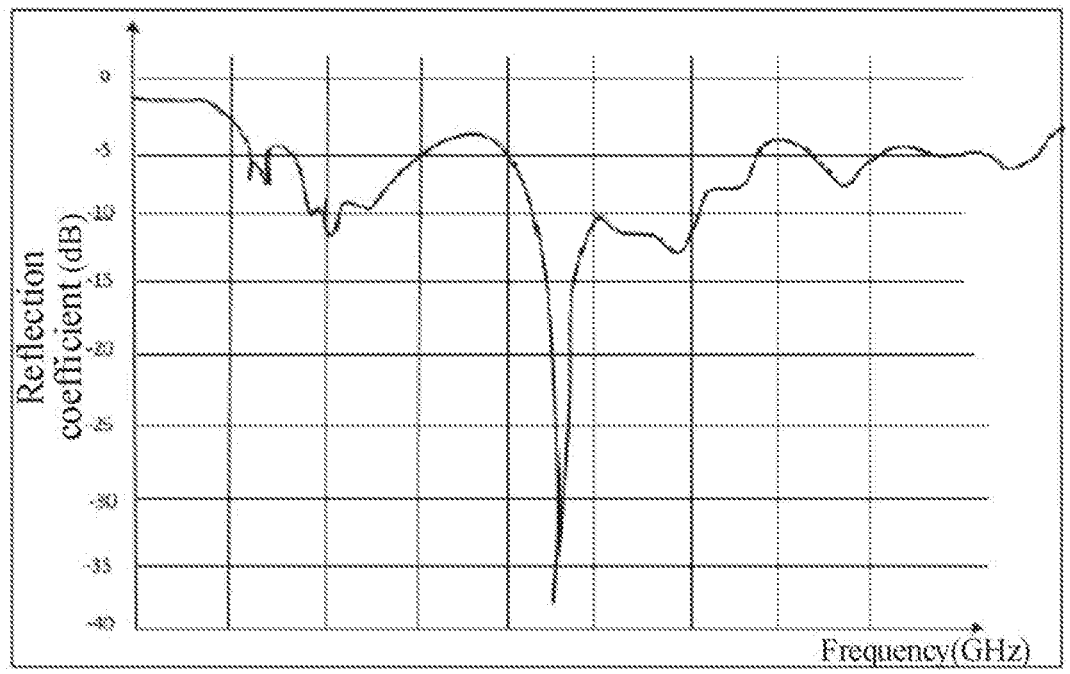
FIG. 15 is a graph illustrating a reflection coefficient of a fifth antenna according to the second embodiment of the present application.
Figure 16:
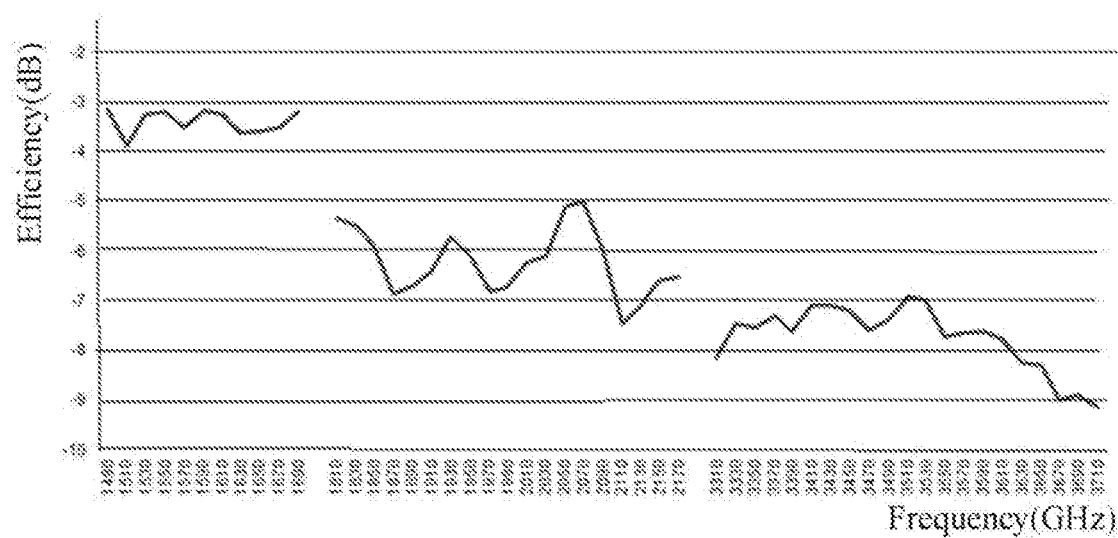
FIG. 16 is a graph illustrating an efficiency of the fifth antenna according to the second embodiment of the present application.

FIG. 15 is a graph illustrating a reflection coefficient of the fifth antenna, and FIG. 16 is a graph illustrating an efficiency of the fifth antenna. It can be seen from the figures that the fifth antenna has a good performance at 3300 MHz~3600 MHz, 1550 MHz~1600 MHz, and 1800 MHz~2700 MHz.

Compared with the prior art, the antenna system in this embodiment includes a first antenna, a second antenna, a third antenna, a fourth antenna, and a fifth antenna respectively; the first antenna, the second antenna, the fourth antenna and the fifth antenna constitute a multi-input multi-output antenna with an operating frequency of 3300 MHz to 3600 MHz, and the second antenna and the third antenna constitute a multi-input multi-output antenna with an operating band of 4800 MHz to 5000 MHz. Thus, the antenna system is capable of supporting an operating band for the terminal in 5G communication, which facilitates the development of mobile terminals in the aspect of 5G communication.

Figure 17:
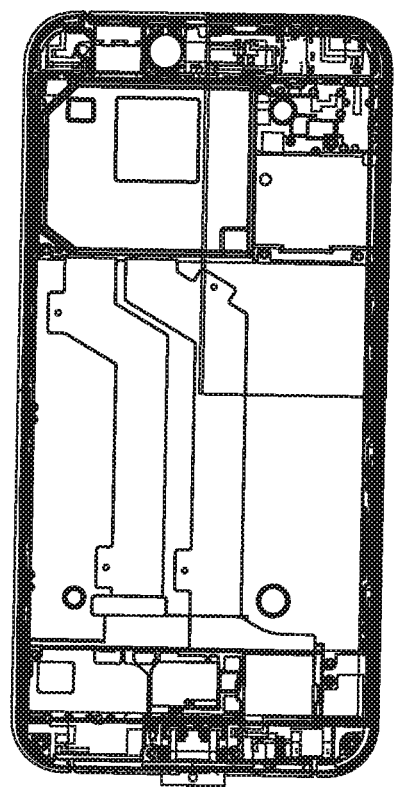
FIG. 17 is a schematic structural diagram of a mobile terminal according to the third embodiment of the present application.

A third embodiment of the present disclosure relates to a mobile terminal, which includes the antenna system provided by the first or second embodiment, as shown in FIG. 17, which illustrates a schematic structure of the mobile terminal.

Of course, the mobile terminal also includes hardwares such as a processor, a memory, and the like, wherein the memory and the processor are connected by a bus, the bus may include any number of interconnected buses and bridges, and it may connect circuits of one or more processors and memories together. The bus may also connect various other circuits together, such as peripherals, voltage regulators, and power management circuits, which are well known in the art and thus will not be further described herein. A bus interface provides an interface between the bus and the antenna system. Data processed by the processor is transmitted over wireless media through the antenna system. Further, the antenna system also receives the data and transmits the data to the processor. The processor manages the bus and normal processings, and provides various functions including timing, peripheral interfacing, voltage regulation, power management, and other control functions. The memory may be used to store data used by the processor when performing operations.

Those skilled in the art may understand that the above embodiments are specific embodiments for implementing the present disclosure, while in practical application, various changes can be made to the embodiment in forms and details, which will not depart from the spirit and scope of the present disclosure.

What is claimed is:

1. An antenna system, comprising: a metal casing, a first antenna bracket and a second antenna bracket disposed within the metal casing, wherein, the metal casing comprises a metal mid-frame and a first metal edge-frame and a second metal edge-frame respectively disconnected from the metal mid-frame;

wherein a first antenna is provided at a first position of the first antenna bracket, and the first antenna is electrically connected to the metal mid-frame and the first metal edge-frame respectively; and a second antenna is provided at a second position of the first antenna bracket, and the second antenna is electrically connected with the metal mid-frame;

a third antenna is provided at a first position of the second antenna bracket, and the third antenna is electrically connected to the metal mid-frame; a fourth antenna is provided at a second position of the second antenna bracket; a fifth antenna is provided at a third position of the second antenna bracket, the fifth antenna is electrically connected to the second metal edge-frame; and the first antenna, the second antenna, the fourth antenna, and the fifth antenna constitute a 4*4 MIMO operating at 3300 MHz to 3600 MHz, and the second antenna and the third antenna constitute a 2*2 MIMO operating at 4800 MHz to 5000 MHz.

2. The antenna system according to claim 1, wherein the antenna system further comprises a first circuit board and a second circuit board disposed within the metal casing and below the first antenna bracket, and a third circuit board disposed within the metal casing and below the second antenna bracket.

3. The antenna system according to claim 2, wherein the first metal edge-frame comprises a first end of the first metal edge-frame and a second end of the first metal edge-frame, the second metal edge-frame comprises a first end of the second metal edge-frame and a second end of the second metal edge-frame, and the metal mid-frame comprises a first end of the metal mid-frame, a second end of the metal mid-frame, a third end of the metal mid-frame and a fourth end of the metal mid-frame;

a first slit is provided between the first end of the first metal edge-frame and the first end of the metal mid-frame, a second slit is provided between the second end of the first metal edge-frame and the second end of the metal mid-frame, a third slit is provided between the first end of the second metal edge-frame and the third end of the metal mid-frame, and a fourth slit is provided between the second end of the second metal edge-frame and the fourth end of the metal mid-frame, wherein the first slit, the second slit, the third slit and the fourth slit are respectively filled with insulating materials.

4. The antenna system according to claim 3, wherein the first antenna comprises a first branch and a second branch, and a first position of the first branch is electrically connected to a grounding point on the first circuit board, a second position of the first branch is electrically connected to the first end of the metal mid-frame, a first position of the second branch is electrically connected to a feeding point of the first circuit board, and a second position of the second branch is electrically connected to the first end of the first metal edge-frame.

5. The antenna system according to claim 4, wherein the antenna system further comprises an access switch, and the access switch is disposed on the first circuit board and electrically connected to a third position of the first branch, wherein the access switch is configured to switch an operating band of the first antenna.

6. The antenna system according to claim 3, wherein, a first position of the second antenna is electrically connected to a grounding point on the second circuit board, and a second position of the second antenna is electrically connected to the second end of the metal mid-frame; or a first position of the third antenna is electrically connected to a first grounding point on the third circuit board, a second position of the third antenna is electrically connected to a first feeding point on the third circuit board, and a third position of the third antenna is electrically connected to the third end of the metal mid-frame.

7. The antenna system according to claim 3, wherein a first position of the fourth antenna is electrically connected to a second grounding point on the third circuit board, and a second position of the fourth antenna is electrically connected to a second feeding point on the third circuit board.

8. The antenna system according to claim 3, wherein a first position of the fifth antenna is electrically connected to a third grounding point on the third circuit board, a second position of the fifth antenna is electrically connected to a third feeding point on the third circuit board, and a third position of the fifth antenna is electrically connected to the second end of the second metal edge-frame.

9. The antenna system according to claim 1, wherein an operating band of the first antenna further comprises 824 MHz~960 MHz and 1710 MHz~2690 MHz, and an operating band of the third antenna further comprises 2400 MHz~2500 MHz and 2300 MHz~2700 MHz, an operating band of the fifth antenna further comprises 1550 MHz~1600 MHz and 1800 MHz~2700 MHz.

10. A mobile terminal applying to an antenna system the antenna system, comprising: a metal casing, a first antenna bracket and a second antenna bracket disposed within the metal casing, wherein, the metal casing comprises a metal mid-frame and a first metal edge-frame and a second metal edge-frame respectively disconnected from the metal mid-frame;
wherein a first antenna is provided at a first position of the first antenna bracket, and the first antenna is electrically connected to the metal mid-frame and the first metal edge-frame respectively; and a second antenna is provided at a second position of the first antenna bracket, and the second antenna is electrically connected with the metal mid-frame;
a third antenna is provided at a first position of the second antenna bracket, and the third antenna is electrically connected to the metal mid-frame; a fourth antenna is provided at a second position of the second antenna bracket; a fifth antenna is provided at a third position of the second antenna bracket, the fifth antenna is electrically connected to the second metal edge-frame; and the first antenna, the second antenna, the fourth antenna, and the fifth antenna constitute a 4*4 MIMO operating at 3300 MHz to 3600 MHz, and the second antenna and the third antenna constitute a 2*2 MIMO operating at 4800 MHz to 5000 MHz.

11. The mobile terminal according to claim 10, wherein the antenna system further comprises a first circuit board and a second circuit board disposed within the metal casing and below the first antenna bracket, and a third circuit board disposed within the metal casing and below the second antenna bracket.

12. The mobile terminal according to claim 11, wherein the first metal edge-frame comprises a first end of the first metal edge-frame and a second end of the first metal edge-frame, the second metal edge-frame comprises a first end of the second metal edge-frame and a second end of the second metal edge-frame, and the metal mid-frame comprises a first end of the metal mid-frame, a second end of the metal mid-frame, a third end of the metal mid-frame and a fourth end of the metal mid-frame;
a first slit is provided between the first end of the first metal edge-frame and the first end of the metal mid-frame, a second slit is provided between the second end of the first metal edge-frame and the second end of the metal mid-frame, a third slit is provided between the first end of the second metal edge-frame and the third end of the metal mid-frame, and a fourth slit is provided between the second end of the second metal edge-frame and the fourth end of the metal mid-frame, wherein the first slit, the second slit, the third slit and the fourth slit are respectively filled with insulating materials.

13. The mobile terminal according to claim 12, wherein the first antenna comprises a first branch and a second branch, and a first position of the first branch is electrically connected to a grounding point on the first circuit board, a second position of the first branch is electrically connected to the first end of the metal mid-frame, a first position of the second branch is electrically connected to a feeding point of the first circuit board, and a second position of the second branch is electrically connected to the first end of the first metal edge-frame.

14. The mobile terminal according to claim 13, wherein the antenna system further comprises an access switch, and the access switch is disposed on the first circuit board and electrically connected to a third position of the first branch, wherein the access switch is configured to switch an operating band of the first antenna.

15. The mobile terminal according to claim 12, wherein, a first position of the second antenna is electrically connected to a grounding point on the second circuit board, and a second position of the second antenna is electrically connected to the second end of the metal mid-frame; or
a first position of the third antenna is electrically connected to a first grounding point on the third circuit board, a second position of the third antenna is electrically connected to a first feeding point on the third circuit board, and a third position of the third antenna is electrically connected to the third end of the metal mid-frame.

16. The mobile terminal according to claim 12, wherein a first position of the fourth antenna is electrically connected to a second grounding point on the third circuit board, and a second position of the fourth antenna is electrically connected to a second feeding point on the third circuit board.

17. The mobile terminal according to claim 12, wherein a first position of the fifth antenna is electrically connected to a third grounding point on the third circuit board, a second position of the fifth antenna is electrically connected to a third feeding point on the third circuit board, and a third position of the fifth antenna is electrically connected to the second end of the second metal edge-frame.

18. The mobile terminal according to claim 10, wherein an operating band of the first antenna further comprises 824 MHz~960 MHz and 1710 MHz~2690 MHz, and an operating band of the third antenna further comprises 2400 MHz~2500 MHz and 2300 MHz~2700 MHz, an operating band of the fifth antenna further comprises 1550 MHz~1600 MHz and 1800 MHz~2700 MHz.

\* \* \* \* \*